United States Patent Office 3,402,276
Patented Sept. 17, 1968

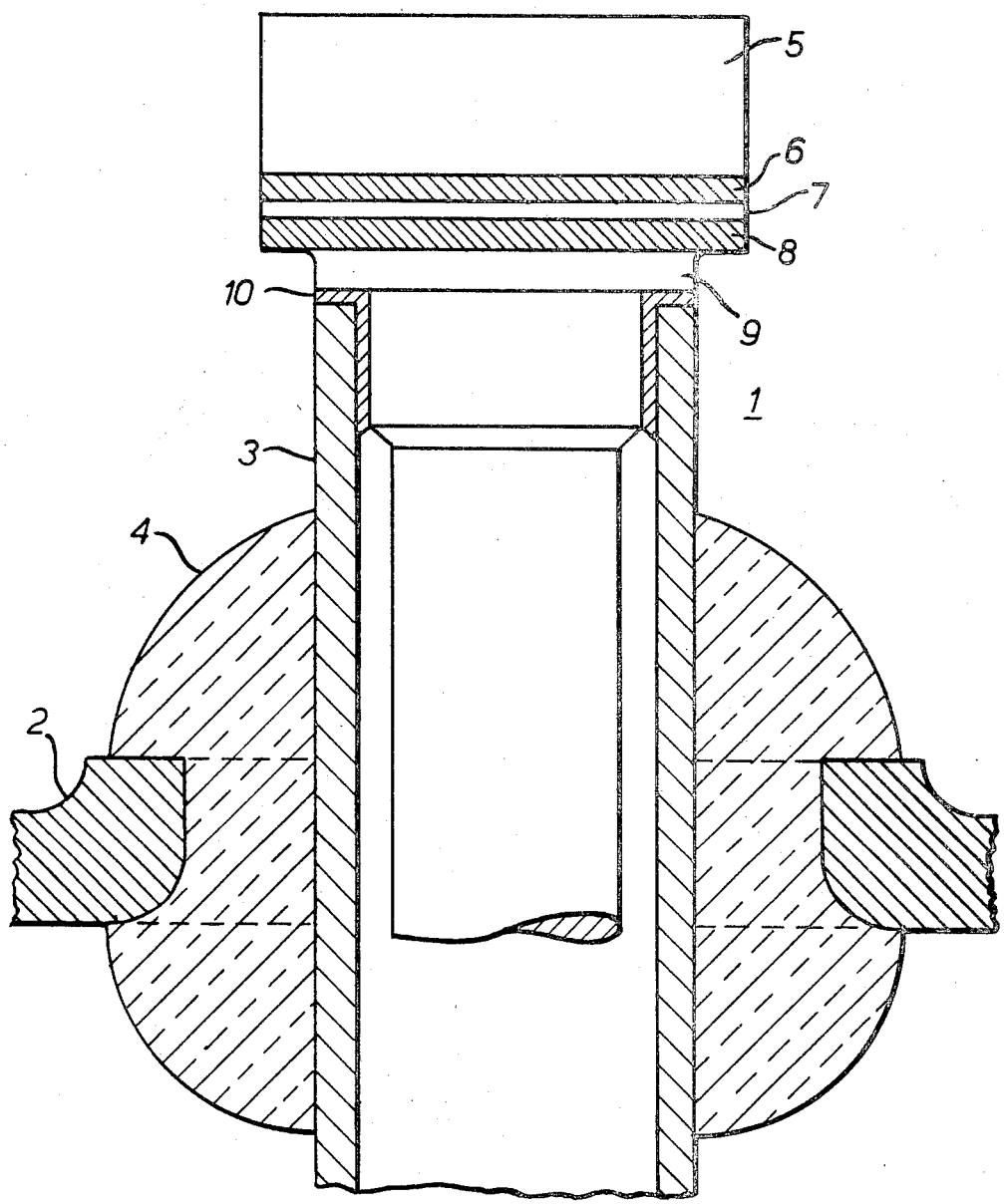

3,402,276
HERMETICALLY SEALED SWITCHES
William Joseph Scott, Rugby, England, assignor to Associated Electrical Industries Limited, London, England,
a British company
Filed June 15, 1967, Ser. No. 646,294
2 Claims. (Cl. 200—166)

ABSTRACT OF THE DISCLOSURE

Contact structures for use in switching devices of the kind having at least one pair of co-acting contacts in an hermetically sealed envelope comprise a contact head or tip of one metal mounted on one end of a shank of a different metal with a thin plate of a third metal interposed between the head or tip and the shank to serve as a barrier to inhibit alloying between the two metals of which the head or tip and the shank are constituted.

Background of the invention

This invention relates to contact structures suitable for use in a switching device of the kind having at least one pair of co-acting contacts located in a hermetically sealed air or gas filled or evacuated envelope.

Known contact structures for switching devices of this kind have consisted of a contact head or tip of one metal—usually silver—mounted on one end of a shank of a different metal—usually copper. One such structure is usually mounted in the envelope of the switching device by brazing the contact structure to a metal lead-through which is hermetically sealed through a refractory insulating bushing forming part of the envelope. The brazing of the structure to the lead-through involves heating the contact structure to a temperature which is sufficiently high for alloying to take place between the metal of the contact head or tip and the different metal of the shank. Alloying between these contact metals may cause damage to the contact head or tip.

Summary of the invention

It is an object of the present invention to provide a contact structure in which the possibility of it being damaged due to alloying between the different metals of the contact head or tip and the shank is reduced.

According to the present invention a contact structure suitable for use in a switching device of the kind set forth comprises a head or tip of one metal, a supporting shank of a second metal and a thin plate of a third metal interposed between the head or tip and the shank and metallically bonded both to the head or tip and the shank with the metal plate serving as a barrier to inhibit alloying between the metal of the head or tip and the metal of the shank. A metal tube supports the shank with an enlarged end portion of the shank hermetically sealed around one end of the tube. The tube is sealed intermediately of its length to an insulating bushing passing through the enclosure wall.

The contact head or tip is conveniently of silver or a silver alloy or silver with a dispersed phase of metal oxide or oxides. The shank is usually of copper and the metal plate disposed between the plate and the tip or head is conveniently nickel, and is bonded thereto by a thin layer of brazing metal.

The contact structure may be mounted in an envelope by brazing the shank to the metal tube or lead-through after the tube has been sealed through an insulating bushing or other insulator forming part of the envelope of the device. The brazing of the shank to the metal lead-through heats the structure to a temperature at which alloying between the metal of the contact head or tip and the metal of the shank could occur but which is prevented by the barrier therebetween.

Brief description of the drawing

In order that the invention may be more readily understood it will now be described, by way of example, with reference to the accompanying drawing which is a section through part of a switching device showing a contact structure in accordance with the present invention mounted therein.

Description of the preferred embodiment

A contactor has a nitrogen filled hermetically sealed envelope with a pair of co-acting contact structures therein. One such structure 1 extends into the enclosure through a sealing ring 2 of Nilo 42 alloy (42% Ni, 58% Fe) welded into the wall of the envelope. Passing through this ring is a lead-through tube 3 of Nilo K alloy (29% Ni, 17% Co, 54% Fe) which is hermetically intermediately sealed along its length into the ring through a fused-on glass bushing 4 so that one end of the tube is within the envelope and the other lies outside thereof. The contact structure consists of a small cylindrical contact head or tip 5 of silver or silver alloy or silver with a dispersed phase of metal oxide or oxides which is joined on one face by a thin layer of silver solder 6 to a thin disc of nckel 7 which in turn is joined by a thin layer of silver solder 8 to one end of a copper shank 9. The shank projects through the lead-through tube 3 and is hermetically joined to the inner end thereof by braze material 10. The braze material may conveniently be copper-silver eutectic. In this application the nickel disc is of the order of .003″ thick faced on each side with a .003″ layer of silver-copper eutectic solder joining it to the tip of contact metal and the copper shank respectively. The nickel disc is fused in position in a hydrogen atmosphere at a temperature of the order of 790°–850° C. and forms a protective barrier against any alloying occurring between the contact metal and the copper shank. Conveniently the sealing ring 2, lead-through tube 3 and the fused glass bushing 4 may be supported on a graphite mould during the silver soldering operation which is carried out at a high temperature.

In an alternative application the nickel disc 7 is directly bonded to the tip or head 5 of contact metal and its exposed nickel face is then bonded to the copper shank by a layer of silver-copper eutectic fused in situ at the high temperature.

I claim:
1. A contact structure suitable for use in a switching device of the kind having at least one pair of co-acting contacts located in an hermetically sealed enclosure comprising a cylindrical tip of a first metal, supported on an enlarged cylindrical end portion of a shank of a second metal, a thin plate of a third metal interposed between the tip and the shank and metallically bonded both to the tip and the shank with the plate serving as a barrier to inhibit alloying between said first and second metals, and a metal tube supporting said shank with said enlarged end portion of the shank hermetically sealed around one end of said tube and said tube hermetically sealed intermediately of its length to an insulating bushing passing through the enclosure wall.

2. A contact structure suitable for use in a switching device of the kind having at least one pair of co-acting contacts located in an hermetically sealed enclosure comprising a tip of a metal of a group consisting of silver, silver alloy and silver with a dispersed phase of metal oxide, a thin disc of nickel, a thin layer of silver solder joining said tip to one face of said disc, a cylindrical copper shank, a thin layer of silver solder joining one end of said copper shank to the other face of said disc, said disc serving as a barrier to inhibit alloying between the metals of said tip and said shank, a metal tube brazed to said shank and a bushing of vitreous material encircling said metal tube and hermetically sealed thereto by fusion.

References Cited

UNITED STATES PATENTS 3,226,517  12/1965  Schreiner _____ 200—166

ROBERT K. SCHAEFER, *Primary Examiner.*

H. O. JONES, *Assistant Examiner.*